US008296536B2

(12) United States Patent
Akirav et al.

(10) Patent No.: US 8,296,536 B2
(45) Date of Patent: Oct. 23, 2012

(54) SYNCHRONIZATION OF REPLICATED SEQUENTIAL ACCESS STORAGE COMPONENTS

(75) Inventors: Shay H. Akirav, Tel Aviv (IL); Yariv Bachar, Tel Aviv (IL); Elena Drobchenko, Tel Aviv (IL); Samuel Krikler, Tel Aviv (IL); Aharon Lazar, Tel Aviv (IL); Itay Maoz, Tel Aviv (IL); Dan Melamed, Tel Aviv (IL); Gil E. Paz, Tel Aviv (IL)

(73) Assignee: International Business Machines Corporation, New York, NY (US)

( * ) Notice: Subject to any disclaimer, the term of this patent is extended or adjusted under 35 U.S.C. 154(b) by 684 days.

(21) Appl. No.: 12/539,066

(22) Filed: Aug. 11, 2009

(65) Prior Publication Data

US 2011/0040942 A1     Feb. 17, 2011

(51) Int. Cl.
*G06F 12/00* (2006.01)
(52) U.S. Cl. .................. 711/162; 711/111; 711/E12.001
(58) Field of Classification Search .................. None
See application file for complete search history.

(56) References Cited

U.S. PATENT DOCUMENTS

| 5,583,995 | A | 12/1996 | Gardner et al. |
| 5,608,865 | A | 3/1997 | Midgely et al. |
| 5,870,759 | A | 2/1999 | Bauer et al. |
| 6,889,297 | B2 | 5/2005 | Krapp et al. |
| 7,539,710 | B1 | 5/2009 | Haustein et al. |
| 2005/0216788 | A1 | 9/2005 | Mani-Meitav et al. |
| 2007/0226413 | A1 | 9/2007 | Elliott et al. |
| 2007/0276833 | A1 | 11/2007 | Sen et al. |
| 2008/0005201 | A1 | 1/2008 | Ting et al. |
| 2008/0013830 | A1 | 1/2008 | Patterson et al. |
| 2008/0263109 | A1 | 10/2008 | Patterson |
| 2008/0288482 | A1 | 11/2008 | Chaudhuri et al. |
| 2009/0106578 | A1 | 4/2009 | Dilman et al. |
| 2009/0132534 | A1 | 5/2009 | Yao et al. |
| 2009/0132619 | A1 | 5/2009 | Arakawa et al. |

OTHER PUBLICATIONS

International Search Report for counterpart application No. PCT/EP2010/060960, mailed Nov. 30, 2010.
Rinard et al., "Eliminating Synchronization Bottlenecks Using Adaptive Replication", ACM Digital Library, vol. 25, No. 3; May 2003, pp. 316-359.
Rinard et al., "Eliminating Synchronization Bottlenecks in Object-Based Programs Using Adaptive Replication", ACM Library, 1999, pp. 83-94.
Choi et al., "A General Framework for Prefetch Scheduling in Linked Data Structures and Its Application . . . " ACM Library, vol. 22, No. 2, May 2004, pp. 214-280.
Litwin et al., "LH—A Highly-Available Scalable Distributed Data Structure", ACM Library, vol. 30, No. 3, Sep. 2005, pp. 769-811.
Jesus Luna et al., "An Analysis of Security Services in Grid Storage Systems," CoreGRID Technical Report, No. TR-0090, Aug. 31, 2007, pp. 1-22.

*Primary Examiner* — Kevin Verbrugge
(74) *Attorney, Agent, or Firm* — Griffiths & Seaton PLLC

(57) ABSTRACT

A replication synchronization table (RST) is configured for the source instance. The RST is adapted for recording compacted information for at least one of a truncate and an erase operation applied on the source instance. The RST of the source instance is updated at a source component with the compacted information. The updated RST is transmitted from the source instance to the replicated instance. Based on the RST of the source instance and the RST of the replicated instance, data representative of a most recent position on the source component from which data should be transmitted to a replicated component to achieve a full synchronization is determined.

25 Claims, 6 Drawing Sheets

SYNCHRONIZATION OF REPLICATED SEQUENTIAL ACCESS STORAGE COMPONENTS

CROSS-REFERENCE TO RELATED APPLICATIONS

The present application is related to U.S. application Ser. No. 12/539,109, entitled "REPLICATION OF DEDUPLICATED DATA," having filed concurrently herewith and U.S. application Ser. No. 12/539,085, entitled "DEDUPLICATED DATA PROCESSING RATE CONTROL," having filed concurrently herewith; both of which are incorporated herein by reference.

BACKGROUND OF THE INVENTION

1. Field of the Invention

The present invention relates in general to computers, and more particularly to apparatus, method and computer program product embodiments for synchronization of replicated sequential access storage components in a computing environment.

2. Description of the Related Art

Sequential access storage components are found in a variety of computing environments. A typical sequential access storage component is the magnetic tape cartridge used via a magnetic tape drive. Multiple tape drives may be contained in a tape library, along with several slots to hold tape cartridges, a barcode reader to identify tape cartridges, and an automated method (i.e. a robot) for loading cartridges into tape drives and slots. Recently, virtual tape libraries were further introduced. Such data storage systems utilize storage components (usually direct access storage, such as disk arrays) to virtually present tape libraries or tape drives. Both types of technologies are commonly used for backup and recovery purposes. Virtual tape libraries, which integrate with existing backup software and existing backup and recovery processes, enable typically faster backup and recovery operations.

SUMMARY OF THE INVENTION

Sequential access storage components in computing environments are characterized by the following characteristics. The components store variable sized blocks of data, which may correspond to user write operations. Position within the data of such a component is specified in terms of these data blocks. The terminology "End of Data" (EOD) herein refers to the position immediately after the last block of data written on the component. Such components enable to set a position (smaller or equal to EOD), and then read or write data blocks sequentially from that position advancing towards EOD (i.e. towards the later blocks). When setting a position equal to EOD and writing a new block of data in that position, the value of EOD is incremented by one. When setting a position smaller than EOD and writing a new block of data in that position, the block of data previously located at that position and all the consecutive blocks of data are invalidated, and the value of EOD is set to be larger by one than the position of the newly written block.

To enhance accessibility to data and fault tolerance capabilities, it may be beneficial that the data of sequential access storage components be replicated to remote systems, often located in geographically distant sites. For instance, virtual tape cartridges may be replicated to remote virtual tape systems. It is beneficial for such replication that the replicated storage components be maintained synchronized with the source instance of the storage component, which allows modification of its data contents (while the replicated instances enable only reading of the data contents). Synchronized components are defined to contain identical user data. Such synchronization may be naively implemented by repeatedly transmitting the entire data contents of the source instance. It is desirable however that this process is made more efficient, such that only the minimal (i.e. necessary and sufficient) data required for synchronization is transmitted, thus minimizing the required bandwidth for transmission of data, and reducing processing requirements on both the source and destination systems. The terminology "minimal data required for synchronization" as discussed herein in the following description and claimed subject matter is intended to refer to the modified and added data compared to the data contained in the replicated instances.

In view of the foregoing and the current state of the art, a need exists for, given a source instance of a sequential access storage component and multiple replicated instances of that component, and given ongoing modifications of the data contained in the source instance of the component, efficient computation for each replicated instance the minimal data required for transmission from the source instance to maintain the synchronization of the replicated instance with the source instance. Moreover, to enable complete independence between the source instance and the replicated instances, and between the replicated instances themselves, it is beneficial that the source instance be unaware of the synchronization statuses of the replicated instances, and that the replicated instances are unaware of the synchronization states of each other. Note also that the source instance may be located along the timeline at different physical systems (i.e. a replicated instance may become the source instance), provided that at any given time there is a single source instance.

Accordingly, to efficiently address these issues, various embodiments for synchronization of source and replicated instances of sequential access storage components in a computing environment by a processor device are provided. These embodiments minimize bandwidth for transmission of data for synchronization, reduce processing requirements on both the source and destination systems, ensure complete data integrity, and enable complete independence among the source and replicated instances, while utilizing the specific properties of sequential access storage components.

In one such embodiment, by way of example only, a replication synchronization table (RST) is configured for the source instance. The RST is adapted for recording compacted information for at least one of a truncate and an erase operation applied on the source instance. The RST of the source instance is updated at a source component with the compacted information. The updated RST is transmitted from the source instance to the replicated instance. Based on the RST of the source instance and the RST of the replicated instance, data representative of a most recent position on the source component from which data should be transmitted to a replicated component to achieve a full synchronization is determined. The data representative of the most recent position is transmitted from the replicated instance to the source instance. Based on the data representative of the most recent position, the replicated instance is synchronized with the source instance while the RST of the replicated instance is updated with the data representative of the most recent position to reflect a synchronization status.

Additional exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
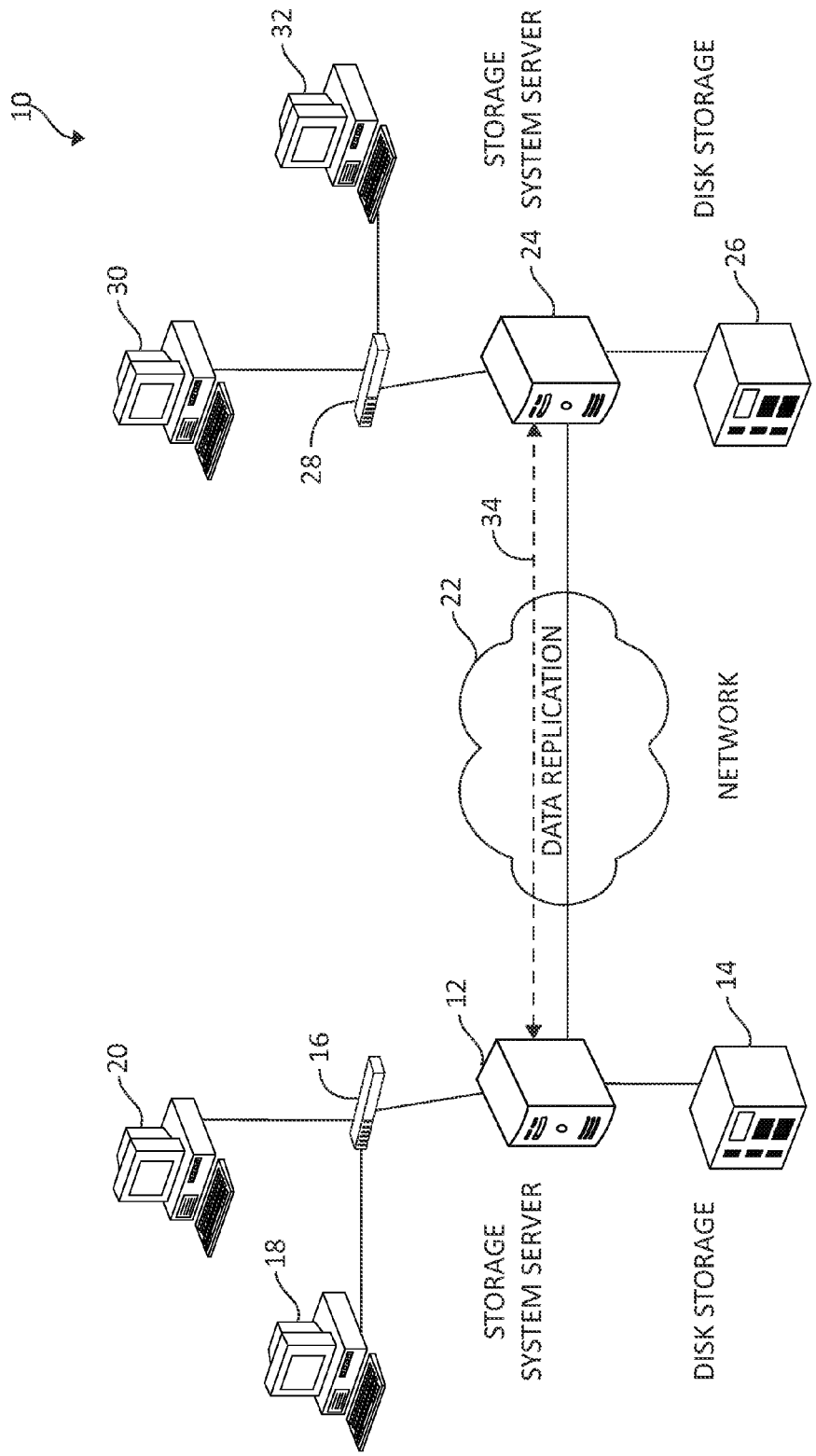
FIG. 1 illustrates an exemplary computing environment in which aspects of the present invention may be implemented.

Turning now to FIG. 1, exemplary architecture 10 of data storage systems (e.g., virtual tape systems) in a computing environment is depicted. Architecture 10 provides storage services to local hosts 18 and 20, and replicate data to remote data storage systems as shown. A local storage system server 12 in communication with a disk storage device 14 is connected to local hosts 18 and 20 over a network including components such as Fibre channel switch 16. Fibre channel switch 16 is capable, for example, of executing commands (such as small computer systems interface (SCSI) commands) for tape devices. Local storage system server 12 is connected over network 22 to a remote storage system server 24. Remote server 24 communicates with a locally connected disk storage device 26, and with locally connected hosts 30 and 32 via another network and network component 28 such as Fibre channel switch 28. The skilled artisan will appreciate that network 22 may include a variety of network topologies, such as a wide area network (WAN), a local area network (LAN), a storage area network (SAN), and other configurations. Similarly, switches 16 and 28 may include other types of network devices.

Architecture 10, as previously described, provides local storage services to local hosts, and provides replicate data to the remote data storage systems (as denoted by data replication functionality using arrow 34). As will be described, various embodiments of the present invention and claimed subject matter may be implemented on architectures such as architecture 10.

There are several major approaches for data replication, which may be used to design and implement replication mechanisms for storage systems such as depicted by architecture 10. However, each approach currently known in the art is not specifically designed to efficiently utilize the specific characteristics of sequential access storage components. One such approach is to use mathematically strong digests (e.g. the MD and SHA hash function sets) to identify data segments based on their contents. Bandwidth reduction may be achieved by exchanging such digest values of the data to be replicated between the source and target systems. However, using such an approach would expose the replication process to a non-zero probability of inconsistency between the source and the replicated copies of the data, due to the reliance on the digest values rather than the actual data. Furthermore, this approach would entail the computation and possibly storage of such strong digest values for all the stored data, thus requiring considerable additional processing and storage resources.

Disk replication is generally based on propagating write operations from the source component to its target components. Synchronous replication means that a write operation on the source component is considered complete only when it is acknowledged by all the target components. This approach guarantees complete consistency between the source and target components. However, it typically has a significant reducing effect on performance. Asynchronous replication means that a write operation on the source component is considered complete as soon as the local operation is complete. Replication of the write operations is performed asynchronously in the background. This approach improves performance, however the most recent write operations may be lost in case of failure of the source component. A significant disadvantage of this approach stems from the fact that it is the source component that keeps track of the synchronization of the target components. The source component receives acknowledgements on write operations received by the target components, and can not proceed to replicate the next write operations until all acknowledgements have been received. Therefore, malfunction of one or more target components may affect the ability to synchronize the entire set of target components.

In the following illustrated embodiments, which also implement asynchronous functionality, it is the target components that calculate their synchronization status vis-à-vis the source component, thus achieving independence between the synchronization statuses of each of the target components. The disk replication approach currently known in the art replicates to the target components all write operations generated on the source component (possibly aggregated by data blocks). In contrast, the mechanisms provided by the illustrated embodiments, which are specifically designed for the special traits of sequential access storage components, enable to avoid transmission of write operations (possibly affecting multiple data blocks) generated on the source component that become irrelevant (before transmission) in the context of specific target components.

Replication of transactional data is generally based on the source system logging the updates and then replicating the logged data to the target systems. The target systems acknowledge reception of the replicated updates, thus allowing to proceed to the replication of subsequent updates. There are also protocols enabling updates to be performed on a data entity via multiple storage systems, rather than one storage system. Methods in this class are generally used within database systems. However, in the context of sequential access storage systems, which may be non transactional, there may be no log of updates to replicate, therefore making this approach inapplicable. Furthermore, since such logs of updates may typically be associated with data entities larger or otherwise different than the data entities that should be replicated, additional non-relevant blocks may be replicated, thus increasing network bandwidth and storage resources used for replication. In general, all these approaches are not designed for sequential access storage components. Adversatively, the illustrated embodiments utilize the specific behavior and traits of sequential access storage components to leverage the efficiency of the replication process reducing both network bandwidth and processing resources requirements, ensuring complete data integrity, and enabling complete independence among the source and replicated instances.

The illustrated embodiments provide a novel approach for replication and synchronization of sequential access storage components, specifically designed for the special characteristics of sequential access storage components, reducing both network bandwidth and processing resources used for the replication and synchronization processes of such components, and thus improving on existing approaches for replication of such components.

Throughout the following description and claimed subject matter, the following terminology, pertaining to sequential access storage components, is described. A "write operation" is intended to refer to writing a block of user-provided data within the sequential access storage component. A "truncate operation" is intended to refer to a write operation performed when the current position within the sequential access storage component is set before its EOD. A truncate operation invalidates the block of data previously located at that position and all the consecutive blocks of data. An "erase operation" is performed when the current position within the sequential access storage component is set before its EOD, and is intended to refer to erasing the block of data located at that position and all the consecutive blocks of data.

As will be seen throughout the following, the illustrated embodiments provide for the maintenance of a data structure denoted herein as a replication synchronization table (RST) that records highly compact information on the truncate and erase operations applied on that instance. For synchronizing a replicated instance, the RST of the source instance, which is very compact in size, is transmitted to the replicated instance, and using an efficient calculation based on the RSTs of both the source and the replicated instances, the minimal required data for synchronization (which is the position on the source component for which data transmission should start) is determined by the replicated instance. This highly compact information is then transmitted back to the source instance, which consequently transmits to the replicated instance only the minimal data required for its synchronization. Upon receiving this data, the replicated component is synchronized with the source component, while also updating its RST accordingly to reflect its new synchronization status.

When the replicated component is synchronized with the source component as its RST is updated, as will be further described (e.g., steps 94 and 96 in FIG. 4, below), a position field of an appended entry to the RST is examined to determine if the position field value is smaller or equal to that of the most recent existing entry in the RST. If yes, then all existing entries in the RST whose position field value is larger or equal to that of the appended entry (except for the appended entry itself) are removed. After the synchronization process between source and replicated components is complete, the source RST and replicated RST entries are identical.

Benefits provided by mechanisms of the illustrated embodiments include the following. As an initial matter by being specifically designed to utilize the specific properties of sequential access storage components, the mechanisms of the illustrated embodiments efficiently minimize the network bandwidth and processing resources on both the source and destination systems, used for the replication and synchronization of sequential access storage components. The mechanisms provided by the illustrated embodiments require very small storage, processing and network resources for their own operation. The embodiments ensure complete data integrity between the source and the replicated instances of the sequential access storage component, and enable complete independence between the synchronization statuses of each of the replicated components, since it is the replicated components that calculate their synchronization status vis-à-vis the source component, in an asynchronous manner. The mechanisms are efficiently fault tolerant to failures during the synchronization process. When restarted after failure, synchronization will start from the point of failure. The mechanisms enable to efficiently handle modifications of data on the source component during its replication, by performing resynchronization of the replication process. Finally, the mechanisms are applicable for any type and implementation of sequential access storage component.

Each instance, source and replicated, of a sequential access storage component, maintains its current end of data (EOD) position, and a replication synchronization table (RST) that records information on the truncate and erase operations applied on that instance. In one embodiment, an entry in the RST consists of the following fields. First, an operation identification value uniquely identifies the operation in the context of a particular storage component (there are no two operations with the same identification value). For a new operation, this identification value may be generated by incrementing an identification variable associated with the storage component. These identification values, which are never recycled, and their associated variable, are allocated with enough bits to accommodate for continuous operation given a predetermined rate of operation and length of time.

An additional field is configured for a value reflective of the position within the component, or position value. The position is specified in terms of the data blocks contained within the component, which are commonly generated by and associated with user write operations. This datum within the entry specifies the position within the component to which the truncate or erase operation was applied (also invalidating or erasing the data blocks subsequent to this location). Finally, a unique system identification value field is configured. The system identified with this datum is the one containing the relevant storage component. The unique system identification may be necessary in some embodiments due to the fact that a component may be migrated between systems.

Figure 2:
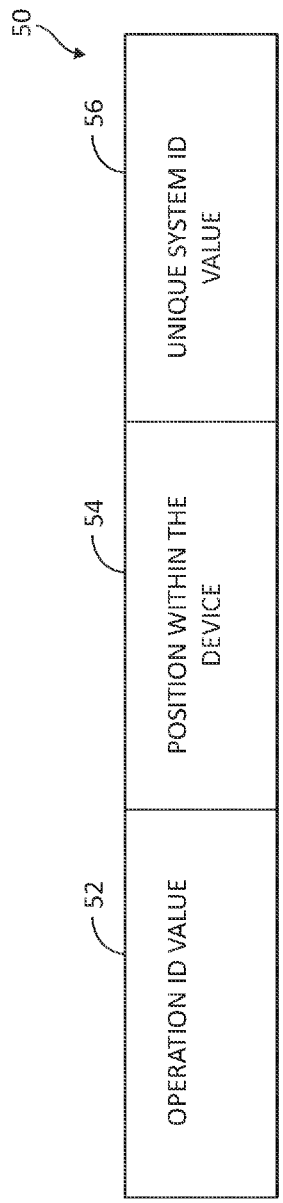
FIG. 2 illustrates an exemplary structure of an entry within a replication synchronization table (RST)

Turning now to FIG. 2, a block diagram of an exemplary data structure 50 of an entry in the RST is depicted. The data structure includes an operation identification (id) value field 52 for an operation id value, a position within the device field 54 for an position value, and a unique system id value field 56 for a system id value.

Figure 3:
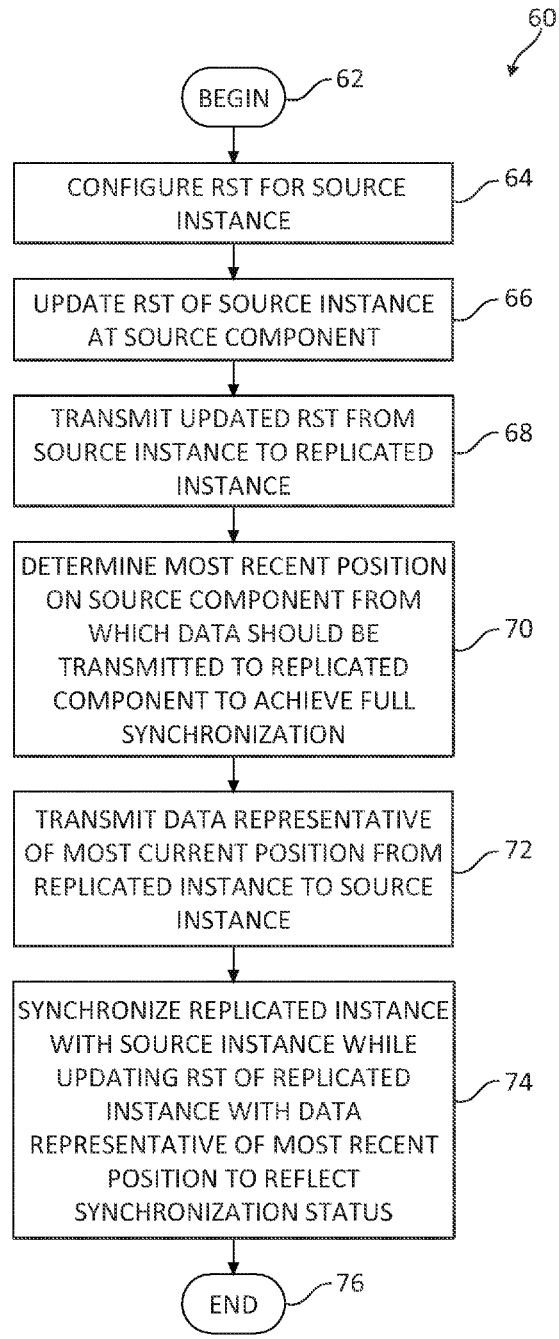
FIG. 3 illustrates an exemplary method for synchronization of source and replicated instances of sequential access storage components.

FIG. 3, following, describes an exemplary method 60 for synchronization of source and replicated instances of sequential access storage components in a computing environment by a processor device. As one skilled in the art will appreciate, various steps in the method 60 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 60 begins (step 62) by configuring a RST for a source instance at a source storage component (step 64). Upon receipt of an operation determined to be an erase and/or truncate operation as will be further described, the RST of the source instance at the source component is updated (step 66) by adding a new entry to the RST. This process will be further described in detail, following. As a next step, the updated RST is transmitted from the source instance to the replicated instance (step 68). Based on the RST of the source and replicated instances, a determination is made of a most recent position on the source component from which data should be transmitted to the replicated component to achieve full synchronization (step 70). This determination step will also be further described in detail, following. Data representative of this most current position is then transmitted from the replicated instance to the source instance (step 72). Based on this data, the replicated instance is synchronized with the source instance, while the RST of the replicated instance is updated with the data to reflect a synchronization status (step 74). The method 60 then ends (step 76).

Referring specifically to step 66 in method 60, an exemplary method for updating the RST at the source component is now described in more detail. As an initial matter, an entry is added to the table for each truncate and erase operation. A write operation is determined to be a truncate operation if the position it applies to is smaller than EOD. The position that a non-null erase operation applies to must also be smaller than EOD. Upon application of a truncate or erase operation on the source component, an entry is generated. The position within the component to which the operation is applied is set as the position in the entry of the operation. The system id value of the system containing the source component is set as the system id in the entry of the operation. The generated entry is appended to the replication synchronization table of the source instance.

If the position field value of the appended entry is smaller or equal to that of the most recent existing entry in the table, then all the existing entries in the table whose position field value is larger or equal to that of the appended entry (except for the appended entry) are removed from the table. This is possible since the operations and user data represented by the removed entries were overridden by the operation and user data represented by the appended entry.

Figure 4:
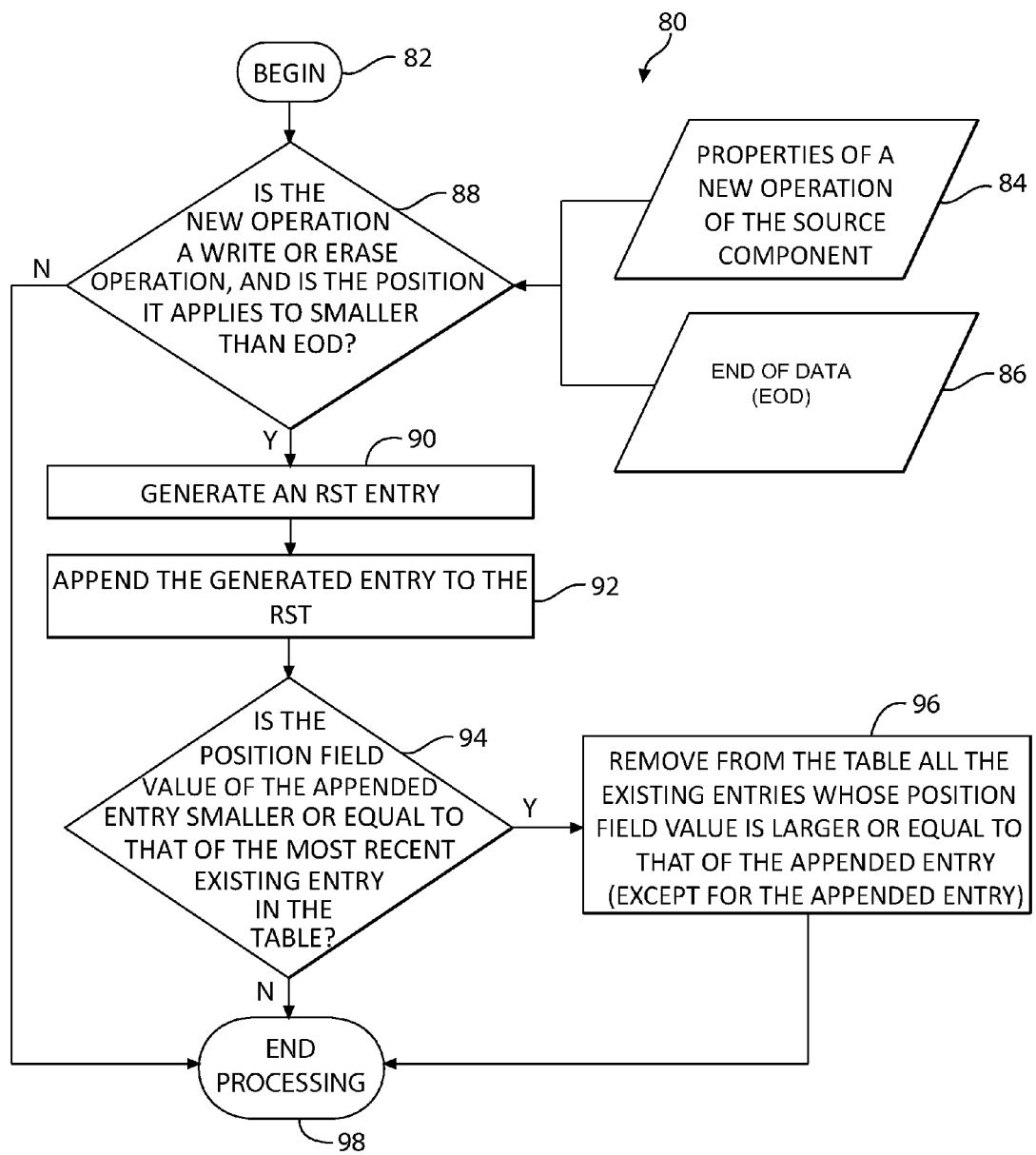
FIG. 4 illustrates an exemplary method for updating the RST at the source component.

Turning now to FIG. 4, an exemplary method 80 for updating the RST of the source instance on the source component is depicted. Method 80 begins (step 82) with considerations of properties of a new operation on the source component (e.g., read, write, truncate operation) in view of EOD (blocks 84 and 86) feeding into the decision 88 of whether the new operation is a write or erase operation, and whether the position is applies to is smaller than EOD. If this is not the case, then the method 80 ends (step 98). If this is, however, the case, then method 80 moves to step 90, where a new RST entry is generated. While not specifically denoted in decision 82 as shown, it should also be noted that in addition, when a replicated instance receives the first write command as the new source instance (even if the first write command is positioned at EOD), an RST entry will be generated.

The generated RST entry is then appended to the RST (step 92). As a following step, decision 94 queries as to whether the position field value of the appended entry is smaller or equal to that of the most recent existing entry in the RST. If this is no the case, then the method 80 ends (again, step 98). If this is so, then all existing entries whose position field value is larger or equal to that of the appended entry (except for that of the appended entry itself) are removed (step 96). The method 80 then ends (again, step 98).

Referring back to steps 68-74 of method 60 (again, FIG. 3), the various processes are now described following in greater detail. Synchronization between source and replicated component may be initiated either by the replicated component or by the source component (e.g. based on the amount of operations applied). The source component transmits its replication synchronization table to each replicated component that should be synchronized. As a following step, the replicated component receives the replication synchronization table of the source component and performs the following calculation to determine the most recent position on the source component from which data should be transmitted to the destination component in order to achieve full synchronization.

Referring specifically to this calculation, as an initial matter, the entry, denoted as Es, is located in the replication synchronization table of the source component, which has the maximal operation id value among all the entries in that table that have an identical entry (i.e. whose field values are identical) in the replication synchronization table of the replicated component. Let Er be the entry that is identical to Es in the replication synchronization table of the replicated component. Note that the contents of the RSTs of both the source and replicated components are identical until Es and Er. Let Es' and Er' be the entries that immediately follow Es and Er correspondingly in the RSTs of the source and replicated components. If Es and Es' exist, then the position on the source component from which data transmission should start is the minimum between the position value of Es', the value of EOD of the replicated component, and the position value of Er' if exists. If Es exists and Es' does not exist, then the position on the source component from which data transmission should start is the minimum between the value of EOD of the replicated component, and the position value of Er' if exists. If Es does not exist then the position on the source component from which data transmission should start is zero.

As a following step, the position on the source component from which data transmission should start is transmitted to the source component. The source component receives this position, locates the position, reads the data and possibly metadata (if exists) from that position and transmits the data/metadata to the replicated component. Reading and transmitting the data on the source component (starting at the position received from the replicated component) may be done in parallel, such that several segments of data on the source component are read and transmitted to the replicated component in parallel. If during this process the data of the source component is modified, then the source component may restart the procedure for synchronization.

The replicated component receives the data (including metadata if existing) transmitted by the source component and updates its data, (again including any existing metadata) and replication synchronization table as follows. As an initial matter, the data received is written to persistent storage upon reception (the data may be received in a non sequential manner). If metadata exists, although it is possibly received in a non-sequential manner, the metadata is written to persistent storage sequentially after its associated data segments are already written to persistent storage. When a sequential segment of data is written to persistent storage, the EOD value is advanced accordingly. Once EOD reaches or surpasses the position of an entry in the replication synchronization table of the source component, which does not yet exist in the replication synchronization table of the replicated component (this is necessarily the earliest of such entries in the source component table, since EOD advanced sequentially), that entry is added to the replication synchronization table of the replicated component, such that all its field values are identical to those appearing in the replication synchronization table of the source component.

If the position field value of the appended entry is smaller or equal to that of the most recent existing entry in the table, then all the existing entries in the table whose position field value is larger or equal to that of the appended entry (except for the appended entry) are removed from the table. This is possible since the operations and user data represented by the removed entries were overridden by the operation and user data represented by the appended entry. Upon completion of this process the contents of the replication synchronization tables of both the source and replicated components are identical, and their EOD values are also identical. The received data and metadata (if existing) may be verified using mathematical digests such as CRC. This process is fault tolerant to failures during the synchronization process. When restarted after failure, synchronization will start from the point of failure.

Figure 5:
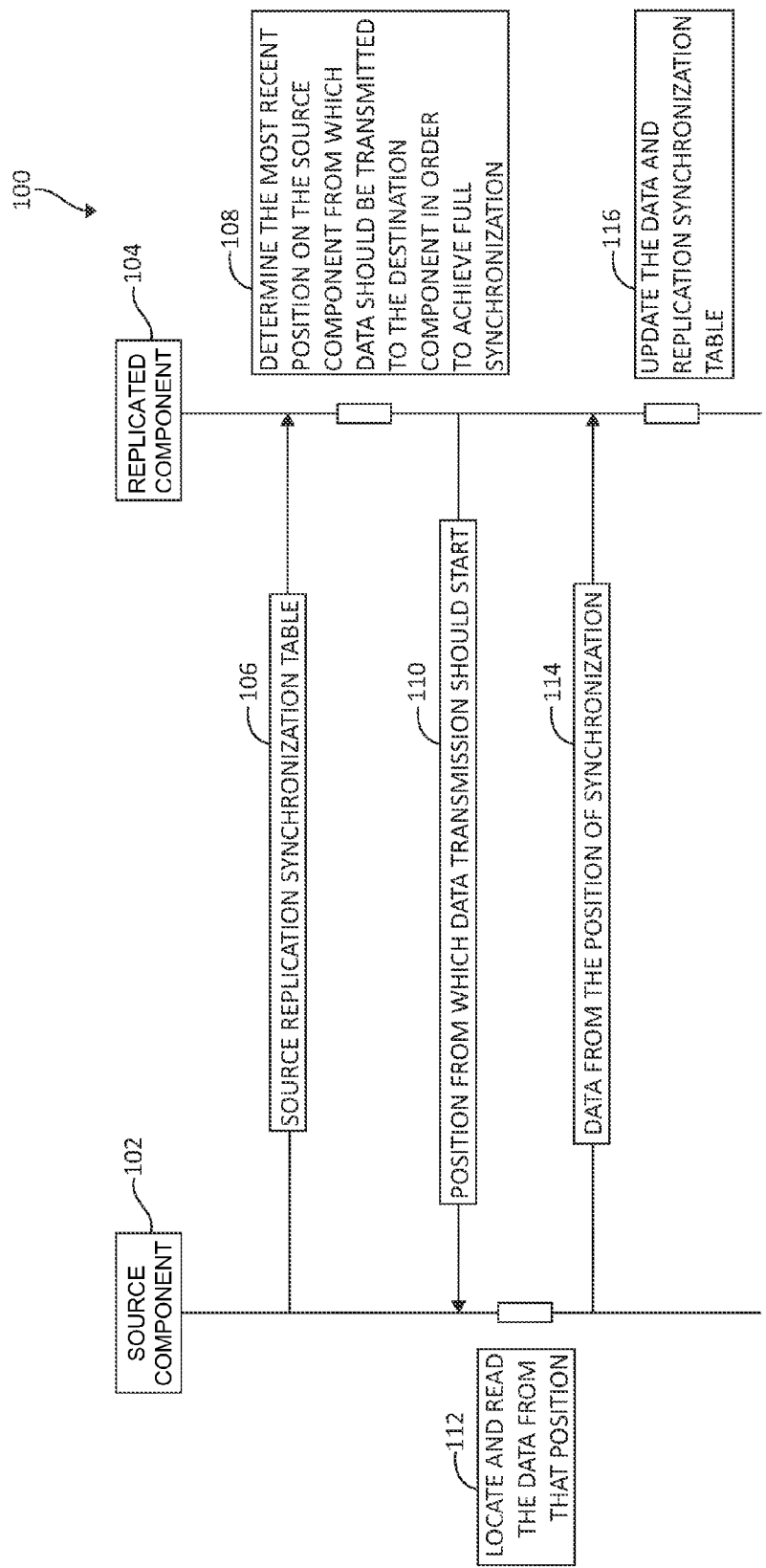
FIG. 5 illustrates an exemplary method for updating the RST at the source and a replicated component, determining data representative of the most recent position, and updating the RST at the replicated component and synchronization between the replicated component and the source component.

Turning now to FIG. 5, the process of synchronization between source and replicated storage components 102 and 104, respectively, in light of the foregoing description is illustrated in a block diagram 100. As shown in process 106, the updated source replication synchronization table is transmitted from the source component 102 to the replicated component 104. At process 108, the replicated component 104 determines the most recent position on the source component 102 from which data should be transmitted to the replicated component 104 in order to achieve full synchronization. The compact data representative of this most recent position is then transmitted back to the source component 102 as indicated in process 110. The data is located and read from the most recent position as indicated in process 112. As a follow up step, the data from the position of synchronization is transmitted to the replicated component 104 as indicated in process 114. The data of the replicated component 104 is updated as the replicated component 104 is synchronized with the source component 102, while the RST of the replicated component 104 is updated to reflect the new synchronization status as indicated in process 116.

Figure 6:
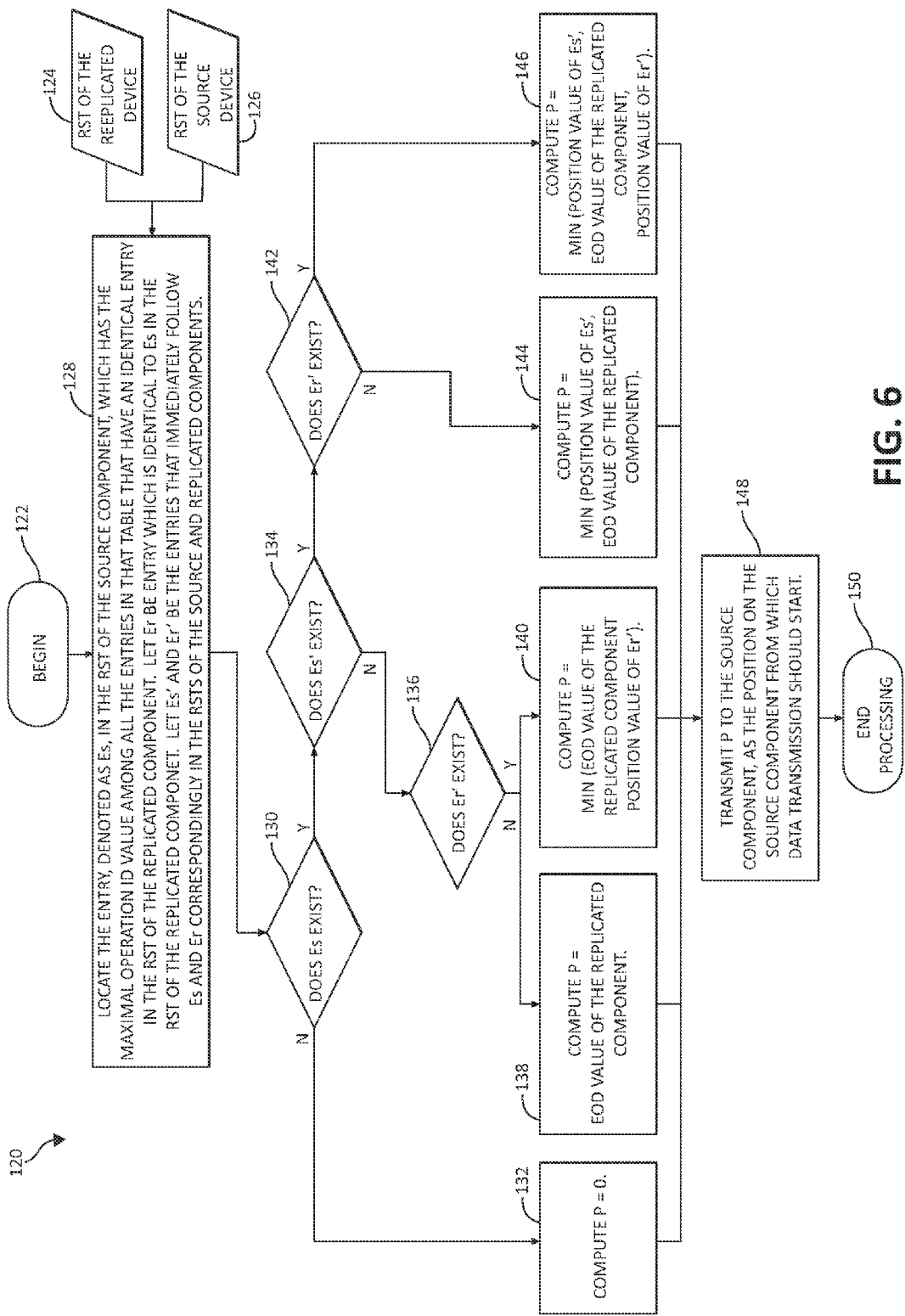
FIG. 6 illustrates an exemplary method for calculating the most recent position on the source component for synchronization with the replicated component.

Turning now to FIG. 6, a flow chart diagram of an exemplary method 120 for calculating the most recent position on the source component for synchronization purposes is illustrated. Method 120 begins (step 122) with a consideration of the RST information of the replicated device 124 and the RST information of the source device 126 into step 128, which locates the entry, denoted as Es, in the replication synchronization table of the source component, which has the maximal operation id value among all the entries in that table that have an identical entry (i.e. whose field values are identical) in the replication synchronization table of the replicated component. Er is designated as the entry that is identical to Es in the replication synchronization table of the replicated component. Again, note that the contents of the RSTs of both the source and replicated components are identical until Es and Er. Es' and Er' are designated as the entries that immediately follow Es and Er correspondingly in the RSTs of the source and replicated components.

If Es and Es' exist (decisions 130 and 134), then the position on the source component from which data transmission should start (denoted here as "P") is calculated as the minimum between the position value of Es', the value of EOD of the replicated component, and the position value of Er' if it exists (decision 142, step 146). If Er' does not exist, then P is calculated as the minimum between the position value of Es', and the value of EOD of the replicated component (decision 142, step 144). If Es exists and Es' does not exist (decision 130, decision 134) then P is calculated as the minimum between the value of EOD of the replicated component, and the position value of Er' if exists (decision 136, step 140). If Er' does not exist, then P is calculated as the EOD value of the replicated component (decision 136, step 138). If Es does not exist (decision 130) then P is calculated as zero (step 132). As a following step, the position on the source component from which data transmission should start is transmitted to the source component (step 148). The method 120 then ends (step 150).

Figure 7:
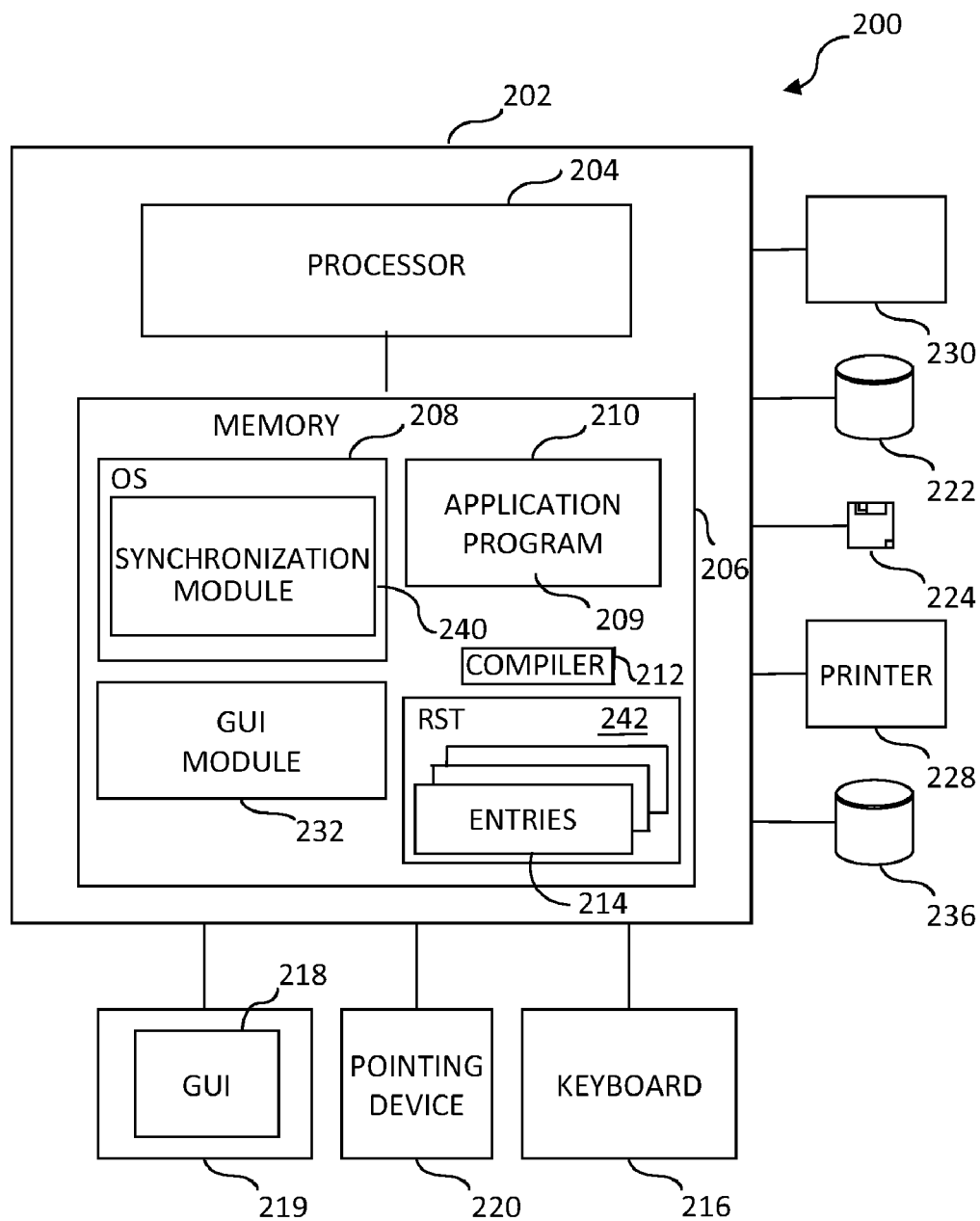
FIG. 7 illustrates an exemplary computing device including a processor device in a computing environment such as the computing environment shown in FIG. 1.

FIG. 7 hereafter provides an example of a portion of the computer environment 10 depicted in FIG. 1 in which the mechanisms of the foregoing embodiments may be implemented. It should be appreciated, however, that FIG. 7 is only exemplary and is not intended to state or imply any limitation as to the particular architectures in which the exemplary aspects of the various embodiments may be implemented. Many modifications to the architecture depicted in FIG. 7 may be made without departing from the scope and spirit of the following description and claimed subject matter.

FIG. 7 illustrates a portion 200 of an exemplary computer environment that can be used to implement embodiments of the present invention. A computer 202 comprises a processor 204 and a memory 206, such as random access memory (RAM). In one embodiment, storage system server 12 (FIG. 1) may include components similar to those shown in computer 202. The computer 202 is operatively coupled to a display 219, which presents images such as windows to the user on a graphical user interface 218. The computer 202 may be coupled to other devices, such as a keyboard 216, a mouse device 220, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the computer program/application program 210, or implemented with special purpose memory and processors. OS 208 includes a synchronization module 240 which may be adapted for carrying out various processes and mechanisms in the exemplary methods previously described.

The computer 202 also implements a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212.

A number of entries 214 in a replication synchronization table (RST) 242 as previously described are stored on memory 206. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. The device 236 may be designated as a backup device 236 for holding backup versions of the number of datasets primarily stored on the device 222. As the skilled artisan will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

In one embodiment, instructions implementing the operating system 208, the computer program 210, and the compiler 212, as well as the entries 214 in the RST 242 are tangibly embodied in a computer-readable medium, e.g., data storage device 222, which may include one or more fixed or removable data storage devices, such as a zip drive, disk 224, hard drive, DVD/CD-ROM, digital tape, etc., which are generically represented as the disk 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). Accordingly, processor 204 may comprise a storage management processor (SMP). The program 210 may operate within a single computer 202 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for synchronization of source and replicated instances of sequential access storage components in a computing environment, comprising:
   a processor operable in the computing environment, wherein the processor is adapted for:
      configuring a replication synchronization table (RST) for the source instance, wherein the RST is adapted for recording compacted information for at least one of a truncate and an erase operation applied on the source instance,
      updating the RST of the source instance at a source component with the compacted information,
      transmitting the updated RST from the source instance to the replicated instance,
      determining, based on the RST of the source instance and the RST of the replicated instance, data representative of a most recent position on the source component from which data should be transmitted to a replicated component to achieve a full synchronization,
      transmitting the data representative of the most recent position from the replicated instance to the source instance, and
      based on the data representative of the most recent position, synchronizing the replicated instance with the source instance while updating the RST of the replicated instance with the data representative of the most recent position to reflect a synchronization status.

2. The system of claim 1, wherein the processor is further adapted for, pursuant to the configuring the RST for the source instance, maintaining a current end of data (EOD) position for each of the source and replicated instances.

3. The system of claim 2, wherein the processor is further adapted for, pursuant to the configuring the RST for the source instance, configuring an entry in the RST to include fields for each of an operation identification value, a position value, and a unique system identification value.

4. The system of claim 3, wherein the processor is further adapted for, pursuant to the updating the RST of the source instance at the source component with the compacted information:
   for the at least one of the truncate and the erase operation, generating a new entry of the RST of the source instance,
   if a write operation applies to a position smaller than the current EOD position for the source instance, determining the write operation to be the truncate operation,
   appending the new entry to the RST of the source instance, and
   if a first position value, based on the new entry, is one of smaller and equal to a second position value based on a most recent existing entry, removing all existing entries having position values one of larger and equal to the first position value.

5. The system of claim 4, wherein the processor is further adapted for, pursuant to the generating the new entry, performing at least one of:
   setting the first position value to a position in the new entry, and
   setting a new unique system identification value of a generator of the new entry as a system identification in the new entry.

6. The system of claim 3, wherein the processor is further adapted for, pursuant to the determining, based on the RST of the source instance and the RST of the replicated instance, the data representative of the most recent position on the source component from which the data should be transmitted to the replicated component to achieve the full synchronization:
   locating a singular entry in the RST of the source instance at the source component having a maximum operation identification value of all entries in the RST having identical entries in the RST of the replicated instance at the replicated component,
   if each of the singular entry and a succeeding entry in the RST of the source instance exists, and a succeeding entry of an identical entry of the singular entry in the RST of the replicated instance exists, calculating the most recent position as a first minimum value between a position value of the succeeding entry in the RST of the source instance, the current EOD position of the replicated instance, and a position value of the succeeding entry of the identical entry of the singular entry in the RST of the replicated instance.

7. The system of claim 6, wherein the processor is further adapted for, pursuant to the determining, if the succeeding entry in the RST of the identical entry of the replicated instance does not exist, calculating the most recent position as a second minimum value between the position value of the succeeding entry in the RST of the source instance and the current EOD position of the replicated instance.

8. The system of claim 6, wherein the processor is further adapted for, pursuant to the determining, if the singular entry exists and the succeeding entry in the RST of the source instance does not exist, and the succeeding entry of the identical entry of the singular entry in the RST of the replicated instance exists, calculating the most recent position as a third minimum value between the current EOD position of the replicated instance and the position value of the succeeding entry of the identical entry of the singular entry in the RST of the replicated instance.

9. The system of claim 7, wherein the processor is further adapted for, pursuant to the determining, if the singular entry exists and each of the succeeding entry in the RST of the source instance and the succeeding entry of the identical entry of the singular entry in the RST of the replicated instance does not exist, calculating the most recent position as the current EOD position of the replicated instance.

10. The system of claim 9, wherein the processor is further adapted for, pursuant to the determining, if the singular entry does not exist, calculating the most recent position as zero.

11. The system of claim 5, wherein the processor is further adapted for, pursuant to the synchronizing the replicated instance with the source instance while updating the RST of the replicated instance with the data representative of the most recent position to reflect the synchronization status, verifying the data representative of the most recent position using a mathematical digest.

12. The system of claim 5, wherein the processor is further adapted for, pursuant to the synchronizing the replicated instance with the source instance while updating the RST of the replicated instance with the data representative of the most recent position to reflect the synchronization status, performing at least one of:
   if the current EOD position for the replicated instance surpasses the first position value of the source instance, appending the new entry to the RST of the replicated instance such that each of the operation identification value, the position value, and the unique system identification value for the new entry of the RST of the replicated instance matches the new entry of the RST of the source instance, and
   if the first position value of the source instance is one of smaller and equal to the second position value, removing all entries from the RST of the replicated instance having position values one of larger and equal to the first position value.

13. A computer program product for synchronization of source and replicated instances of sequential access storage components in a computing environment by a processor device, the computer program product comprising a computer-readable storage medium having computer-readable program code portions stored therein, the computer-readable program code portions comprising:
   a first executable portion for configuring a replication synchronization table (RST) for the source instance, wherein the RST is adapted for recording compacted information for at least one of a truncate and an erase operation applied on the source instance;
   a second executable portion for updating the RST of the source instance at a source component with the compacted information;
   a third executable portion for transmitting the updated RST from the source instance to the replicated instance;
   a fourth executable portion for determining, based on the RST of the source instance and the RST of the replicated instance, data representative of a most recent position on the source component from which data should be transmitted to a replicated component to achieve a full synchronization;
   a fifth executable portion for transmitting the data representative of the most recent position from the replicated instance to the source instance; and
   a sixth executable portion for, based on the data representative of the most recent position, synchronizing the replicated instance with the source instance while updating the RST of the replicated instance with the data representative of the most recent position to reflect a synchronization status.

14. The computer program product of claim 13, further including a seventh executable portion for, pursuant to the configuring the RST for the source instance, maintaining a current end of data (EOD) position for each of the source and replicated instances.

15. The computer program product of claim 14, further including an eighth executable portion for, pursuant to the configuring the RST for the source instance, configuring an entry in the RST to include fields for each of an operation identification value, a position value, and a unique system identification value.

16. The computer program product of claim 15, further including a ninth executable portion for, pursuant to the updating the RST of the source instance at the source component with the compacted information:
   for the at least one of the truncate and the erase operation, generating a new entry of the RST of the source instance,
   if a write operation applies to a position smaller than the current EOD position for the source instance, determining the write operation to be the truncate operation,
   appending the new entry to the RST of the source instance, and
   if a first position value, based on the new entry, is one of smaller and equal to a second position value based on a most recent existing entry, removing all existing entries having position values one of larger and equal to the first position value.

17. The computer program product of claim 16, further including a tenth executable portion for, pursuant to the generating the new entry, performing at least one of:
   setting the first position value to a position in the new entry, and
   setting a new unique system identification value of a generator of the new entry as a system identification in the new entry.

18. The computer program product of claim 15, further including a ninth executable portion for, pursuant to the determining, based on the RST of the source instance and the RST of the replicated instance, the data representative of the most recent position on the source component from which the data should be transmitted to the replicated component to achieve the full synchronization:
   locating a singular entry in the RST of the source instance at the source component having a maximum operation identification value of all entries in the RST having identical entries in the RST of the replicated instance at the replicated component,
   if each of the singular entry and a succeeding entry in the RST of the source instance exists, and a succeeding entry of an identical entry of the singular entry in the RST of the replicated instance exists, calculating the most recent position as a first minimum value between a position value of the succeeding entry in the RST of the source instance, the current EOD position of the replicated instance, and a position value of the succeeding entry of the identical entry of the singular entry in the RST of the replicated instance.

19. The computer program product of claim 18, further including a tenth executable portion for, pursuant to the determining, if the succeeding entry in the RST of the identical entry of the replicated instance does not exist, calculating the most recent position as a second minimum value between the position value of the succeeding entry in the RST of the source instance and the current EOD position of the replicated instance.

20. The computer program product of claim 19, further including an eleventh executable portion for, pursuant to the determining, if the singular entry exists and the succeeding entry in the RST of the source instance does not exist, and the succeeding entry of the identical entry of the singular entry in the RST of the replicated instance exists, calculating the most recent position as a third minimum value between the current EOD position of the replicated instance and the position value of the succeeding entry of the identical entry of the singular entry in the RST of the replicated instance.

21. The computer program product of claim 20, further including a twelfth executable portion for, pursuant to the determining, if the singular entry exists and each of the succeeding entry in the RST of the source instance and the succeeding entry of the identical entry of the singular entry in the RST of the replicated instance does not exist, calculating the most recent position as the current EOD position of the replicated instance.

22. The computer program product of claim 21, further including a thirteenth executable portion for, pursuant to the determining, if the singular entry does not exist, calculating the most recent position as zero.

23. The computer program product of claim 16, further including a tenth executable portion for, pursuant to the synchronizing the replicated instance with the source instance while updating the RST of the replicated instance with the data representative of the most recent position to reflect the synchronization status, performing at least one of:
   writing the data representative of the most recent position to a persistent storage location, and
   advancing the current EOD position for the replicated instance.

24. The computer program product of claim 23, further including an eleventh executable portion for, pursuant to the synchronizing the replicated instance with the source instance while updating the RST of the replicated instance with the data representative of the most recent position to reflect the synchronization status, verifying the data representative of the most recent position using a mathematical digest.

25. The computer program product of claim 23, further including an eleventh executable portion for, pursuant to the synchronizing the replicated instance with the source instance while updating the RST of the replicated instance with the data representative of the most recent position to reflect the synchronization status, performing at least one of:
   if the current EOD position for the replicated instance surpasses the first position value of the source instance, appending the new entry to the RST of the replicated instance such that each of the operation identification value, the position value, and the unique system identification value for the new entry of the RST of the replicated instance matches the new entry of the RST of the source instance, and
   if the first position value of the source instance is one of smaller and equal to the second position value, removing all entries from the RST of the replicated instance having position values one of larger and equal to the first position value.

* * * * *